US012554830B2

(12) United States Patent
Kumar et al.

(10) Patent No.: US 12,554,830 B2
(45) Date of Patent: Feb. 17, 2026

(54) ENHANCING INTELLIGENCE IN PARENTAL CONTROL

(71) Applicant: Adeia Guides Inc., San Jose, CA (US)

(72) Inventors: Vijay Kumar, Karnataka (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 385 days.

(21) Appl. No.: 17/107,445

(22) Filed: Nov. 30, 2020

(65) Prior Publication Data

US 2022/0171845 A1   Jun. 2, 2022

(51) Int. Cl.
G06F 21/50 (2013.01)

(52) U.S. Cl.
CPC .......... G06F 21/50 (2013.01); *G06F 2221/03* (2013.01); *G06F 2221/2111* (2013.01)

(58) Field of Classification Search
CPC ................ G06F 21/50; G06F 2221/03; G06F 2221/2111; G06F 21/552; G06F 2221/2105
See application file for complete search history.

(56) References Cited

U.S. PATENT DOCUMENTS

| | | | | |
|---|---|---|---|---|
| 10,061,916 B1 * | 8/2018 | Jiang | | G06F 21/316 |
| 10,360,744 B1 * | 7/2019 | Kerzner | | H04N 7/185 |
| 2007/0300307 A1 * | 12/2007 | Duncan | | G06F 21/31 726/27 |
| 2008/0199838 A1 * | 8/2008 | Flanagan | | G07F 7/0866 434/236 |
| 2012/0198489 A1 * | 8/2012 | O'Connell | | G06Q 30/06 725/14 |
| 2013/0226674 A1 * | 8/2013 | Field | | G06Q 50/20 705/7.38 |
| 2014/0114880 A1 * | 4/2014 | Breeden | | G06Q 40/06 705/36 R |
| 2015/0242605 A1 * | 8/2015 | Du | | G06F 21/32 726/7 |
| 2015/0310195 A1 * | 10/2015 | Bailor | | G06F 21/45 726/6 |
| 2017/0148264 A1 * | 5/2017 | Pichette | | G06Q 20/123 |
| 2019/0377853 A1 * | 12/2019 | Obaidi | | G06F 21/32 |
| 2020/0242450 A1 * | 7/2020 | Tang | | G06F 17/16 |
| 2020/0303063 A1 * | 9/2020 | Sharma | | G16H 40/67 |
| 2020/0314180 A1 * | 10/2020 | Sant | | H04L 67/1097 |
| 2021/0044578 A1 * | 2/2021 | Chan | | H04L 63/04 |
| 2021/0065907 A1 * | 3/2021 | Neumann | | G06N 20/00 |
| 2021/0103842 A1 * | 4/2021 | Hardin | | H04W 12/68 |
| 2021/0144150 A1 * | 5/2021 | James | | H04W 12/08 |

(Continued)

FOREIGN PATENT DOCUMENTS

JP          2019168762 A   * 10/2019

*Primary Examiner* — Huan V Doan
(74) *Attorney, Agent, or Firm* — HG LAW LLP

(57) ABSTRACT

Systems and methods are provided for automatically implementing parental controls at a computing device. One example method includes identifying a user profile and determining a baseline user behavior associated with the user profile. Deviations from the baseline user behavior at a computing device associated with the user profile are monitored for. A confidence value is generated based on the deviations from the baseline user behavior. An action to perform at the computing device is determined based on the user behavior and the confidence value. The action is performed.

20 Claims, 10 Drawing Sheets

(56) References Cited

U.S. PATENT DOCUMENTS

| | | |
|---|---|---|
| 2021/0240835 A1* | 8/2021 | Koganti ................ G06F 21/552 |
| 2021/0264116 A1* | 8/2021 | Thor ....................... G06F 40/30 |
| 2021/0286981 A1* | 9/2021 | Fujii ...................... G06V 40/16 |
| 2021/0297437 A1* | 9/2021 | Huston, III ......... H04L 63/1425 |
| 2022/0020021 A1* | 1/2022 | Kurylko ............... G06Q 20/405 |
| 2022/0108701 A1* | 4/2022 | Gupta ................ H04M 7/0078 |
| 2022/0114477 A1* | 4/2022 | Kou ........................ G06N 5/04 |

\* cited by examiner

| Baseline User Behavior | Deviation from Baseline | Generated Confidence Value | Determined Action |
|---|---|---|---|
| Watch Cartoons Between 18:00-20:00 | Watch Action Movie from 19:30 | -15 | Stop Action Movie from playing |
| Watch Programs with No Content Marked to Indicate an "Adult" Content Type | Attempt to Watch a Part of a Program with Content Marked to indicate "Adult" Content type | -80 | Block Access to Content based on Rating Value and Transmit Message to Parent |
| Use Mobile Device in Den Between the Hours of 8:00-9:00 | Use Mobile Device in Bedroom Between the Hours of 8:00-9:00 | -32 | Display Pop-up at Mobile Device |
| Determine Age of user as 15 | User Enters Age into Website as 21 | -68 | Block Access to Content and Transmit Message to Parent |
| User Types Password in Two Bursts at a Laptop | User Types Password in a Broken, Letter-by letter Manner, at the Laptop | -3 | Display Popup at Laptop |
| User Does Not Adjust Volume at PC | User Mutes Volume at PC | -18 | Transmit Message to Parent |

502 — Identify a User Profile

504 — Determine a Baseline User Behavior Associated With the User Profile

506 — Monitor for Deviations from the Baseline User Behavior at a Computing Device 508 — Generate a Confidence Value Based on the Deviations from the Baseline User Behavior 510 — Is the Confidence Value Below a Threshold Value? — No Yes 512 — Determine an Action to Perform at the Computing Device 514 — Perform the Action at the Computing Device

FIG. 5

ENHANCING INTELLIGENCE IN PARENTAL CONTROL

BACKGROUND

The disclosure relates to automatically implementing parental controls at a computing device and, in particular, systems and related methods for performing an action at a computing device based on a deviation from a baseline user behavior.

SUMMARY

With the proliferation of computing devices, such as laptops, smartphones and tablets, there has been an increase in the use of systems that can display content to a user, for example, a movie, a television program and/or a website. A user may access content that is appropriate for the user, for example, a 12-year-old accessing a cartoon; however, the same user may also access content that is not appropriate for the user, for example, adult content. In order to prevent users, such as children, from accessing content that is not appropriate for them, parents may use some form of parental controls to control the content that a user can access on a computing device, for example, a word-based filter to prevent a computing device from accessing adult websites. Typically, users may find ways of traversing parental control software, for example, by using a proxy, guessing a password and/or misrepresenting their age. If a group of parents, for example, a group of parents at a school, use the same parental control software, then children may share ways of traversing the blocks and protections implemented by the parental control software, making the software mostly redundant. Further, rule-based solutions, such as blocking all access to proxies, are not always desirable for a user. A user may desire, for example, to use a proxy to protect their privacy when accessing certain content. In this example, blocking access to all proxies would not be desirable.

In view of the foregoing, it would be beneficial to have a system that automatically implements parental controls at a computing device that can take a user behavior into account.

Systems and methods are described herein for automatically implementing parental controls at a computing device. In accordance with an aspect of the disclosure, a method is provided for automatically implementing parental controls at a computing device. A user profile is identified and a baseline user behavior associated with the user profile is determined. Deviations from the baseline user behavior at a computing device associated with the user profile are monitored for. A confidence value is generated based on the deviations from the baseline user behavior. An action to perform, based on the user behavior and the confidence value, is determined. The action is performed.

An example implementation of such a method is described in connection with a user using a laptop to access content. A user logs onto the laptop, at which point a user profile is identified. On weekdays, the user accesses, via the laptop, cartoons between the hours of 18:00 and 20:00. A baseline user behavior of watching cartoons between the hours of 18:00 and 20:00 on weekdays is determined. The user's behavior is monitored to look for any deviations from watching cartoons between the hours of 18:00 and 20:00. If the user continues to watch cartoons between the hours of 18:00 and 20:00, then a high confidence value is generated, for example, 100. If the user, for example, starts watching an action movie at 19:30, i.e., a deviation from the baseline user behavior, then a lower confidence value is generated, for example, 80. An action to perform is determined, for example, displaying a pop-up to the user saying, "Please stop watching the movie at 20:00 or the movie will be automatically stopped." Alternatively, based on the confidence value and the user behavior, no action may be taken. For example, no pop-up may be displayed. However, if an additional deviation from the baseline user behavior occurs, for example, watching the movie beyond 20:00, this may lower the confidence value further, for example, from 80 to 63. This additional lowering in the confidence value may cause an action to be determined and subsequently performed at the laptop, for example, automatically stopping the movie.

The confidence value may be generated with a trained network, for example, the confidence value may be generated by a trained artificial intelligence engine, by a trained neural network and/or by machine learning. This may occur through supervised learning, semi-supervised learning and/or unsupervised learning. At least one of the determining the baseline user behavior, monitoring for deviations, generating the confidence value, determining the action to perform and/or performing the action may take place at a server. For example, the computing device may transmit data from the computing device to a server, via the internet, such that the server can perform any of the aforementioned steps. Additionally and/or alternatively, the user profile may be stored at a server and retrieved by the computing device when a user provides a user credential at the computing device.

Determining a baseline user behavior may comprise determining a baseline type of content accessed, for example, cartoons, action movies and/or news programs. Monitoring for deviations may comprise monitoring for deviations in the type of content accessed, for example, adult content and/or movies rated NC-17. In this example, attempting to watch adult content may negatively impact the confidence value. Determining a baseline user behavior may comprise determining whether the user accesses marked content and, if the user accesses marked content, determining a baseline type and/or frequency of the marked content accessed. Marked content is content that has an indicator indicating that the content may not be suitable for all viewers. The movie itself may not be marked, but one or more scenes in the movie may be. For example, the start and end of a sex scene in a movie may be marked to indicate that it is not suitable for younger viewers. The monitoring for deviations may comprise monitoring for deviations in the type and/or frequency of the marked content accessed. For example, a user may watch a movie comprising the sex scene and may subsequently return to the sex scene. In this example, attempting to return to the sex scene may negatively impact the confidence value.

Determining a baseline user behavior may comprise determining a baseline location pattern associated with the computing device and/or the user profile. For example, a user may use their mobile phone in the den, on weekdays, between the hours of 18:00-20:00. The baseline location pattern may make use of satellite navigation data, such as that provided by GPS, GLONASS, BeiDou, Galileo, NavIC, QZSS and/or DORIS. Additionally and/or alternatively, determining the baseline location pattern may comprise determining typical wireless signal strengths of one or more networks, for example, the signal strength of a Wi-Fi network and/or the signal strength of a cellular network. The computing device may not be actively connected to one of these networks, as the signal strength can be passively collected. The baseline location pattern may also comprise determining a base station that a computing device typically connects to; for example, a household may have a "downstairs" router and an "upstairs" router. A user may typically connect to the "downstairs" router. In an example, the user may also be typically connected to a BLUETOOTH device, such a smart speaker (i.e., the location data pattern may also comprise a proximity to a static second device). The monitoring for deviations may comprise monitoring whether the location of the computing device deviates from the location pattern. For example, a user may attempt to access inappropriate content from a private location, such as a bedroom. In this example, the user may connect to the "upstairs" router rather than the "downstairs" router. The user may not be connected to the BLUETOOTH smart speaker, and a cellular data signal may increase in strength. In this example, the confidence value may be negatively impacted by these factors.

Determining a baseline user behavior may comprise determining an approximate age of a user and/or identifying a stored user age. For example, a user age may be associated with a user profile that is used to log onto a computing device, such as a smartphone. Alternatively, the user's age may be determined through baseline user behavior, for example, a user that browses for toys on the internet and watches cartoons may be determined as having an age in the range 11-13 years old. The monitoring for deviations may comprise monitoring for a user input comprising an age that differs from the determined age and/or the stored user age. For example, a user may attempt to access an adult site and input a date of birth that indicates that they are 25 years old. In this example, the confidence value may be negatively impacted by this factor.

Determining a baseline user behavior may comprise determining a user credential input pattern, the credential input pattern comprising a user typing cadence and/or incorrect user input. A user will typically enter their password with a similar cadence (a typing rhythm) each time. For example, a user who can touch-type may have a smoother rhythm than someone who cannot touch-type. In another example, a first user may use the number row above the letter keys on a keyboard to enter numbers in their password, whereas a second user may use the number pad on a keyboard to enter numbers in their password. Additionally, a first user may typically make one mistake entering their password each week, whereas a second user may typically make multiple mistakes in entering their password each week. The monitoring for deviations may comprise monitoring for deviations in the user typing cadence and/or for deviations in incorrect user input. For example, a user who uses a different cadence may have found a password that has been written down somewhere, or a user who makes multiple mistakes may be trying to guess a password. In this example, the confidence value may be negatively impacted by a different typing cadence and/or may be progressively negatively impacted each time an incorrect password is entered.

Determining a baseline user behavior may comprise determining a baseline computing device volume associated with the user. For example, a user may keep their volume at level 30. Monitoring for deviations may comprise monitoring for a deviation in the computing device volume associated with the user. For example, a user wishing to avoid attention because they are accessing age-inappropriate content may mute the volume on the computing device that they are using. In this example, the confidence value may be negatively impacted by the user muting the volume at their computing device.

The action of the method may be one of displaying a pop-up, blocking access to a subset of content based on a rating value, blocking access to all content and/or transmitting a message to another user. For example, the pop-up may be a warning to a user that if they continue the action that they are performing, then another action may be performed. Blocking access to all content may comprise preventing access to a network, for example, the internet. Transmitting a message may comprise displaying an alert at a computing device of another user, for example, displaying an alert on a mobile phone of a parent that a child is attempting to access age-inappropriate content.

A network may be trained to generate the confidence value. Source user behavior data may be provided. The source user behavior data may comprise a plurality of user behaviors associated with a computing device and/or a user profile for a computing device. A mathematical representation of the source user behavior data may be produced. The source user behaviors may be assigned a value that represents the context of the user behavior (i.e., whether it should lead to an increase or a decrease in the confidence value). The network may be trained, using the mathematical representation of the source user behavior data, to determine a confidence value based on the deviations from the baseline user behavior.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which:

FIG. 3 is an exemplary data structure for indicating baseline user behaviors, deviations from the baseline behaviors and determined actions, in accordance with some embodiments of the disclosure;

FIG. 5 is a flowchart representing a process for automatically implementing parental controls at a computing device, in accordance with some embodiments of the disclosure;

DETAILED DESCRIPTION

Figure 1:
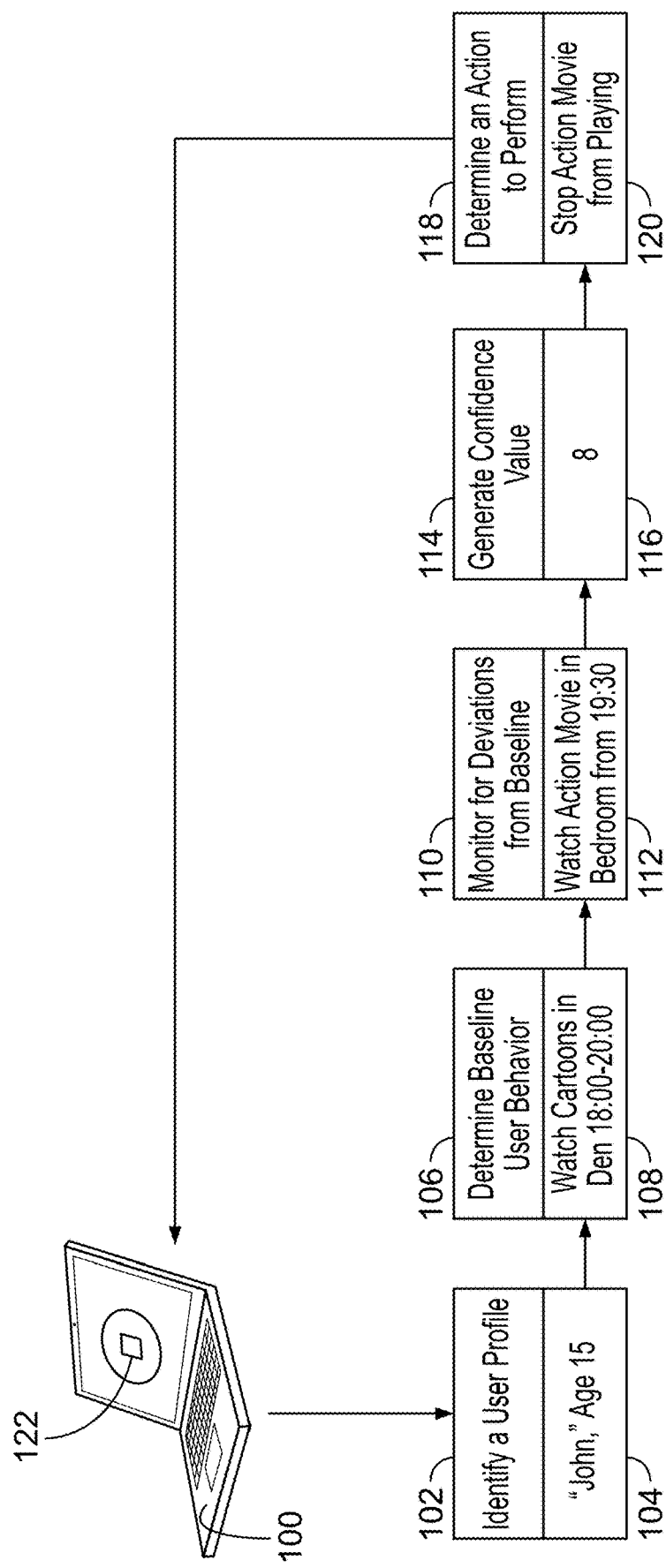
FIG. 1 shows an exemplary environment in which parental controls are automatically implemented at a computing device, in accordance with some embodiments of the disclosure.
Figure 2A:
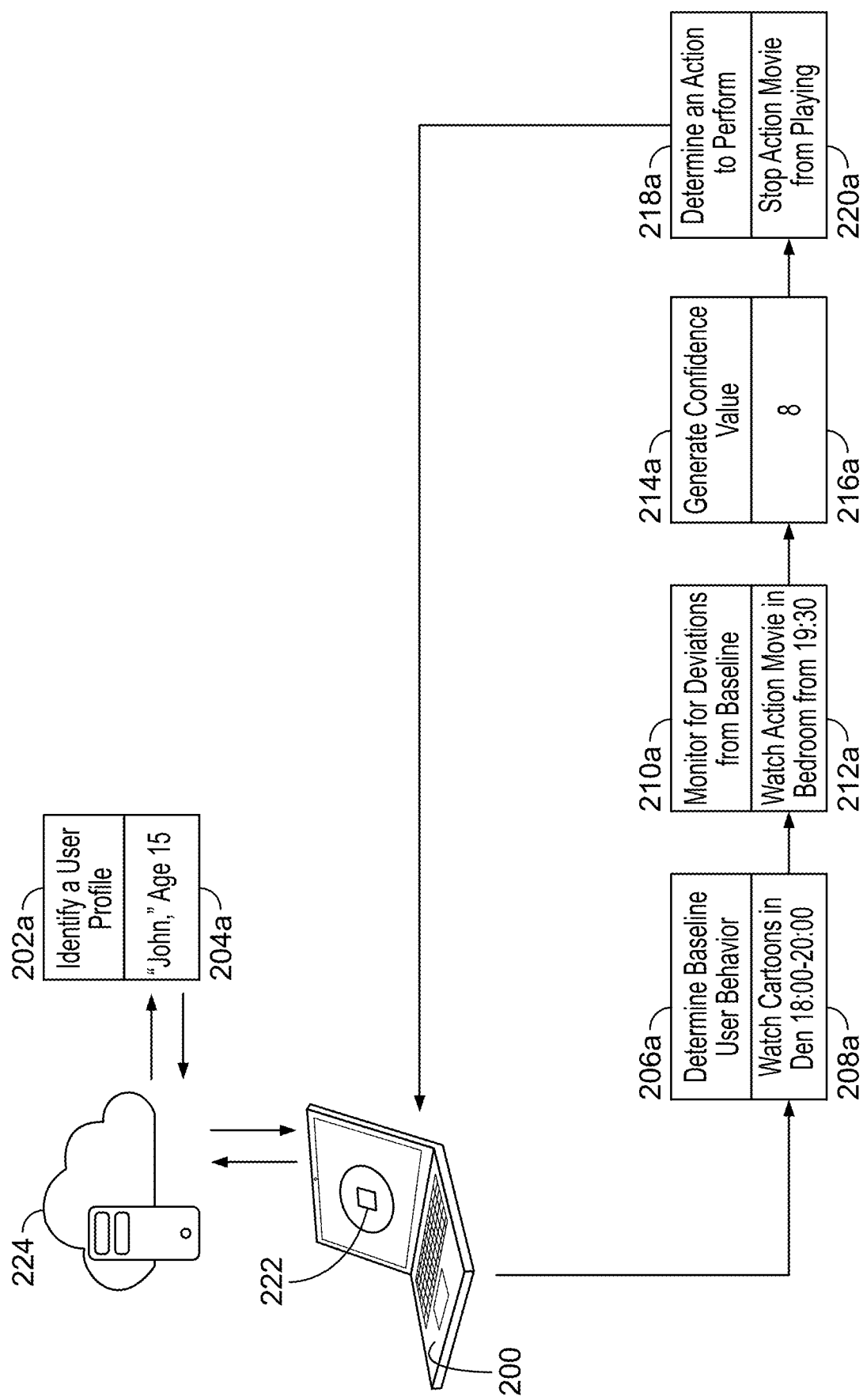
FIG. 2A shows an exemplary environment in which parental controls are automatically implemented at a computing device, in accordance with some embodiments of the disclosure.
Figure 2B:
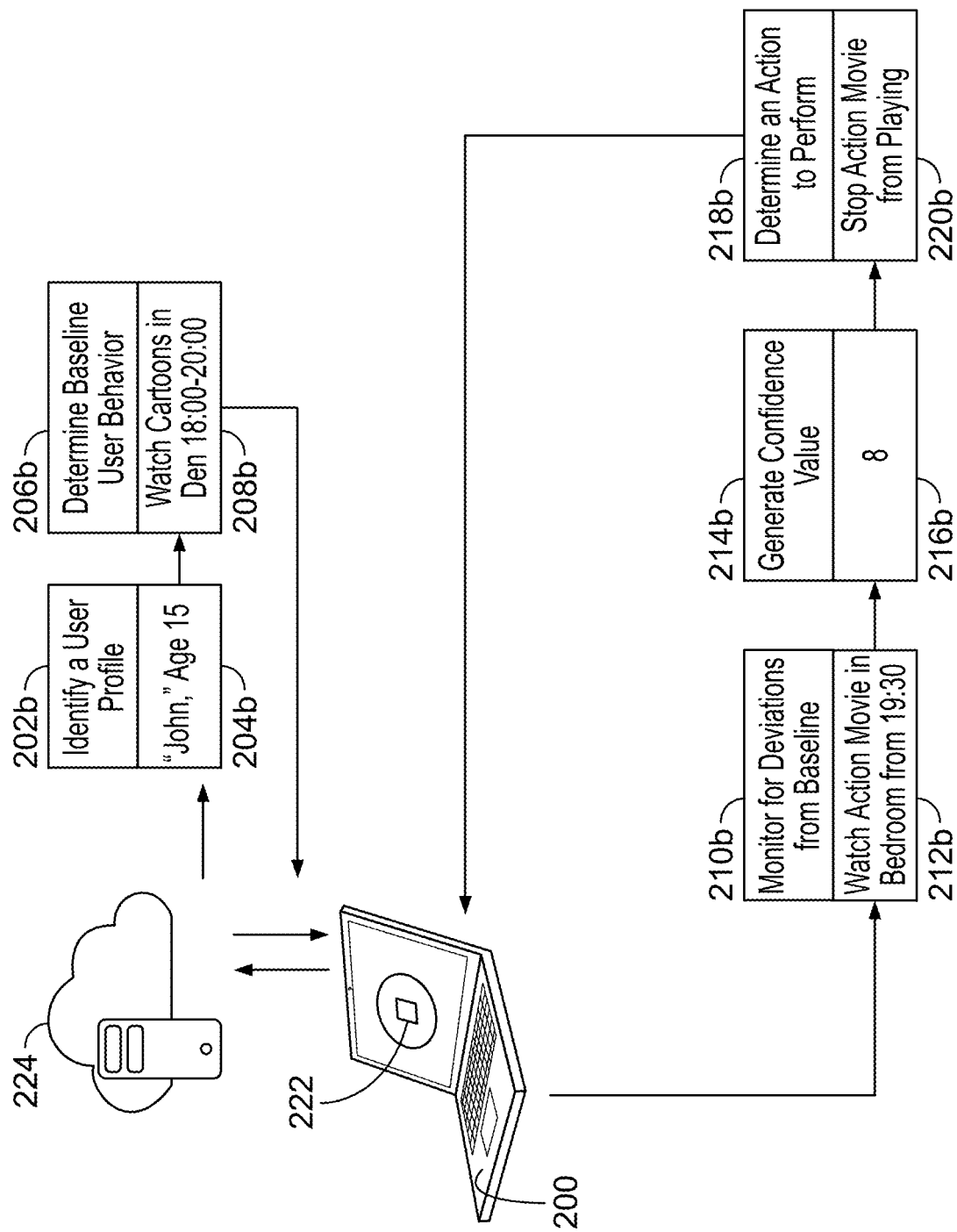
FIG. 2B shows an exemplary environment in which parental controls are automatically implemented at a computing device, in accordance with some embodiments of the disclosure.
Figure 2C:
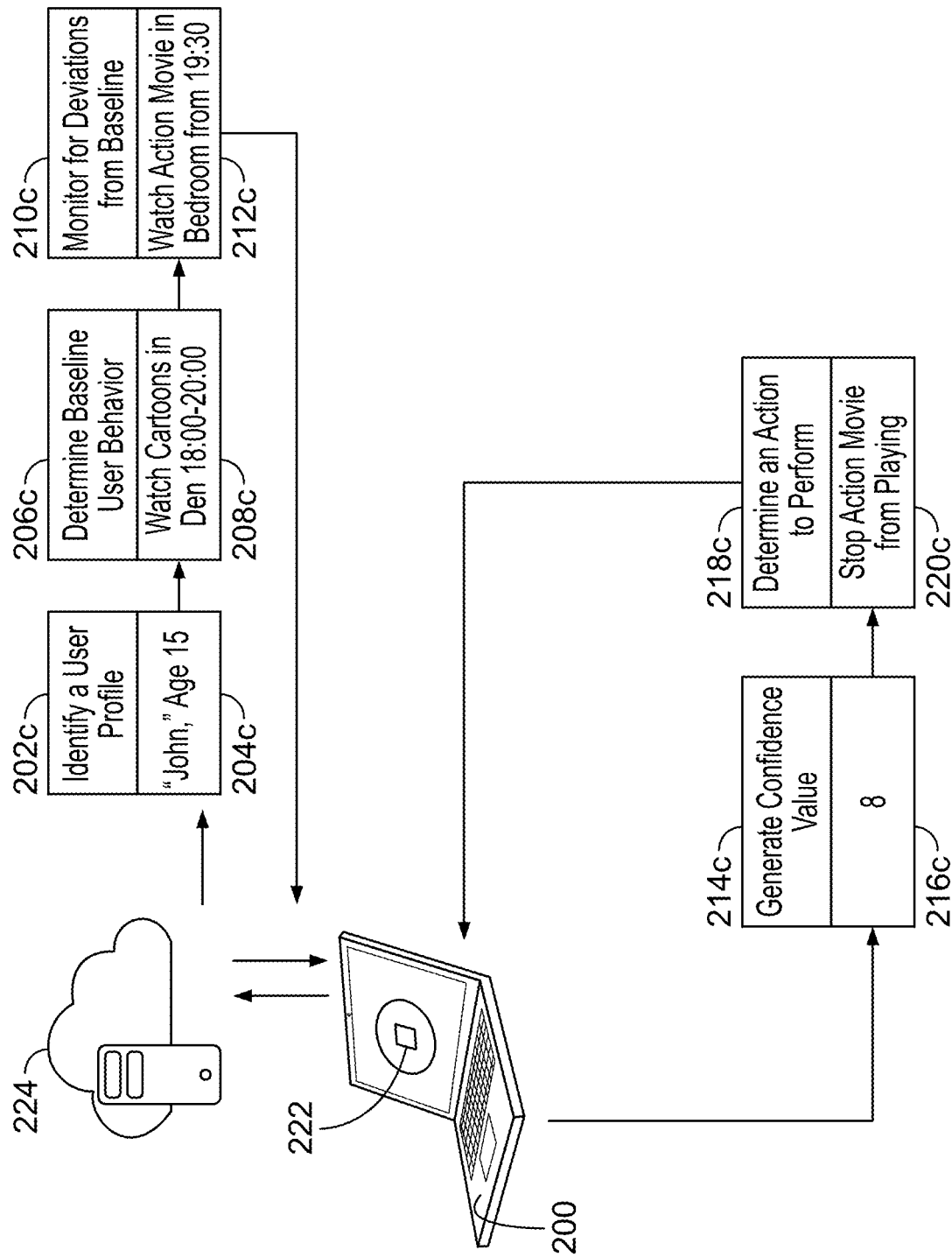
FIG. 2C shows an exemplary environment in which parental controls are automatically implemented at a computing device, in accordance with some embodiments of the disclosure.
Figure 2D:
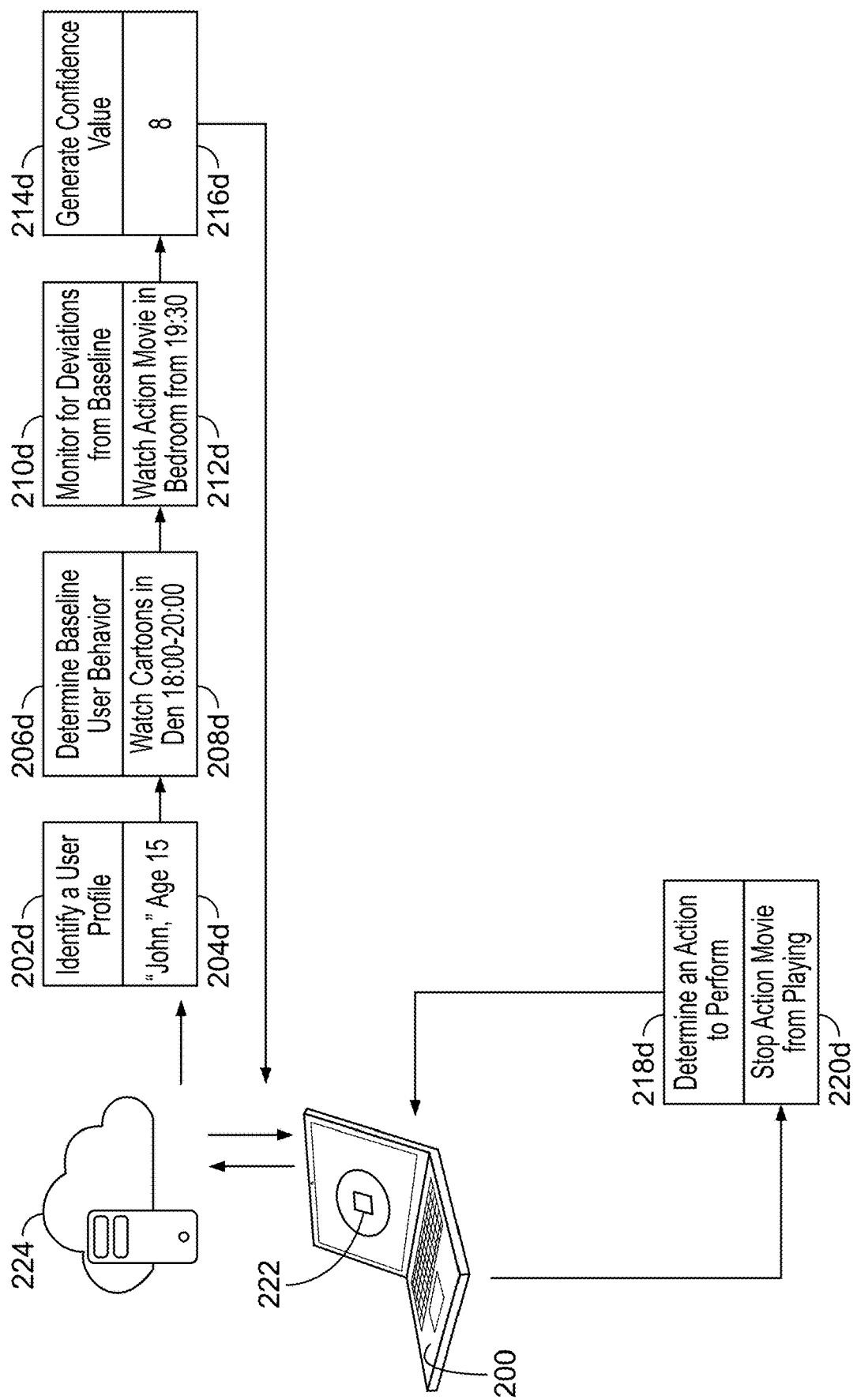
FIG. 2D shows an exemplary environment in which parental controls are automatically implemented at a computing device, in accordance with some embodiments of the disclosure.
Figure 2E:
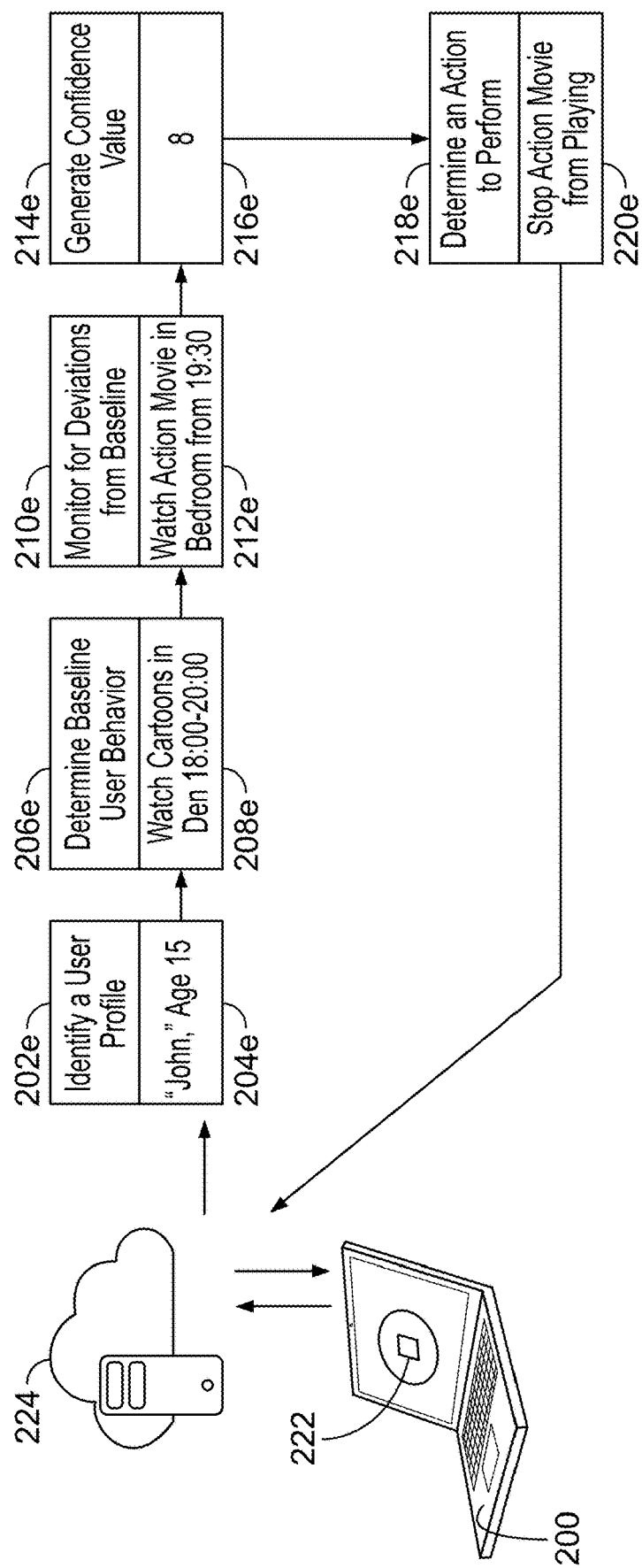
FIG. 2E shows an exemplary environment in which parental controls are automatically implemented at a computing device, in accordance with some embodiments of the disclosure.

Systems and methods are described herein for automatically implementing parental controls at a computing device. As referred to herein, parental controls include any control that allows a user to control how a computing device operates and/or the content accessible by the computing device. The parental controls may be implemented locally on the computing device and/or implemented by a device remote from the computing device, for example, a server. Parental controls may include content filters such as blocklists/denylists and allowlists/safelists (i.e., content is allowed by default, apart from what is blocked, or content is blocked by default, apart from what is allowed) that restrict the content viewable by a user. Parental controls may also include usage controls that allow a computing device to be used only at certain times or in certain locations. Parental controls can be associated with a computing device itself, for example, "the kid's tablet," or with a user profile, for example, a profile that "Kate" uses to log onto a computing device.

As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a router, or any other television equipment, computing equipment, or wireless device, and/or combination of the same.

As referred to herein, a user profile may be the profile that a user uses to log onto a computing device and/or a user profile that a user uses to log onto a service, for example, a website and/or a video-on-demand app. Alternatively and/or additionally, it may be a profile associated with parental control software installed on a device. Alternatively and/or additionally, it may be an identifier associated with a computing device, such as a MAC address and/or a device name. A user profile may be associated with a single person. A user profile may be associated with multiple people, for example, if a laptop has a single user login and multiple users use the same laptop.

As referred to here, content may be a video; audio; a combination of the two (audiovisual); a website comprising text, video and/or audio; a program and/or application comprising text, video and/or audio; and/or any other content accessible via a computing device. Content may comprise a file stored locally on a computing device. Alternatively and/or additionally, content may be streamed over a network from a second computing device, such as a server. Streamed media may be provided in a substantially real-time manner, or it may refer to media accessed from a remote computing device.

Performing an action includes performing an action via a program running on a computing device, for example, preventing a program from accessing content, such as a movie.

A network is any network on which computing devices can communicate. This includes wired and wireless networks. It also includes intranets, the internet and/or any combination of the two. Where multiple devices are communicating, this includes known arrangements of devices. For example, it may include multiple devices communicating via a central server, or via multiple servers. In other cases, it may include multiple devices communicating in a peer-to-peer manner as defined by an appropriate peer-to-peer protocol.

The disclosed methods and systems may be implemented on a computing device.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

FIG. 1 shows an exemplary environment in which parental controls are automatically implemented at a computing device, in accordance with some embodiments of the disclosure. At a laptop 100, a user profile is identified 102. In this example, a parent has installed parental control software on the laptop and has indicated that the user of the laptop is "John" and is 15 years old 104. As the laptop 100 is used, a baseline user behavior is determined 106. In this example, the baseline user behavior is watching cartoons in the den between the hours of 18:00 and 20:00 108. Although the baseline behavior in this example comprises the type of content, the location and the time at which content is viewed, the baseline behavior may comprise any number of behaviors, such as a single behavior, five behaviors, ten behaviors.

Although not shown in this example, the baseline user behavior may also be established by determining the types of programs and/or applications accessed by a user; determining metadata associated with the content; using picture, video, text and/or speech recognition to determine the context of content; and/or identifying keywords in content. The baseline behavior may also be established by determining internet sites accessed by a user and comparing them to a database of internet sites, wherein the database comprises additional information about the internet sites. The baseline user behavior may be established by determining the time that programs, applications and/or content is accessed. The baseline user behavior may be established by determining that content comprises marked content. Marked content is content that has an indicator indicating that the content may not be suitable for all viewers and may apply only to a subset of content being viewed: for example, a movie itself may not be marked, but one or more scenes in the movie may be.

The baseline user behavior may be established by determining a baseline location pattern associated with the computing device. The baseline user behavior may also be established by determining an approximate age of a user and/or identifying a stored user age. The baseline user behavior may also be established by determining a credential input pattern comprising a user typing cadence and/or incorrect user input. The baseline user behavior may also be established by determining a baseline computing device volume associated with the user.

Once the baseline user behavior has been established, the software monitors for deviations from the baseline user behavior 110. In this example, an action movie is watched at the computing device, in the bedroom from 19:30 112. This is a deviation from the baseline user behavior, as the type of content is different, the location is different, and the action movie is scheduled to finish after 20:00. All these factors contribute to the generated confidence value. Although all three factors are different in this example, the user may deviate in only one respect, for example, by watching cartoons in the kitchen. The monitoring for deviations may be an absolute monitoring, for example, "the location is different from normal" or may be comprise further information, such as, for example, the location is the kitchen, whereas it is normally the den.

Although not shown in this example, the monitoring for deviations from the baseline user behavior may include monitoring for changes in programs, applications, websites and/or other content that is accessed. It may also include monitoring for changes in time when content is accessed. It may also include monitoring for changes in the type of content accessed, or the type and/or frequency of marked content accessed. It may include determining a frequency of deviation and/or a distance of deviation from a location pattern. It may include monitoring for a user input comprising an age that differs from the determined age and/or the stored user age. It may include monitoring for deviations in the user typing cadence and/or for deviations from incorrect user input. It may include monitoring for a deviation in the computing device volume associated with the user. A user may also access content when they attempt to access content, for example, a user may access an adult movie, but the parental control software may block their access before the movie can play.

A confidence value is generated 114 based on the deviations from the baseline user behavior. In this example, the confidence value is 8 out of 20 116. A low confidence value may reflect that the parental software has a low confidence that the user is behaving in the baseline, normal, manner. Each of the factors (i.e., the difference in content type, the different location and that the movie is scheduled to end after 20:00) all contribute to a lower confidence value being generated. The confidence value may be calculated based on there being a deviation, for example, if a user usually watches cartoons, both an adult movie and an action movie may contribute to the confidence value the same amount, simply because they are a different content type to "cartoons." Alternatively, the confidence value may be calculated on the context of the deviation, for example, an adult movie may have a larger weighting in the calculation of the confidence value than an action movie. The confidence value may be generated in response to a user behavior, for example, in response to a user accessing or attempting to access a movie. Alternatively, the confidence value may be calculated at regular intervals, for example, based on a user's deviations from the baseline user behavior over the last 30 minutes, day and/or week. The confidence value may be generated in isolation, and an action to be performed may be determined based on a single confidence value. Alternatively, the user may start with a confidence value at a first value, for example 100, and each deviation from the baseline user behavior may subtract from the first value, for example, giving confidence values of 97, 82, 75, etc. As time passes and no deviations are detected, the confidence value may be incremented, for example, 75, 80, 85, 90, 95, 100. The confidence value may also be an average of generated confidence values. For example, a first deviation may have a confidence value of −5 associated with it and a second deviation may have a confidence value of −15 associated with it, which may give an averaged confidence value of −10.

The confidence value may be generated with a trained network; for example, the confidence value may be generated by a trained artificial intelligence engine, a trained neural network and/or by machine learning. This may occur through supervised learning, semi-supervised learning and/or unsupervised learning. In this example, the network may be trained on what user behavior is typical for a certain age range, for example, the sorts of content and times that may be associated with a nine-year-old. In another example, the network may be trained on the profiles of different family members. In this example, the network may learn that an adult family member has lots of deviations and, thus, a small change in the confidence value should be associated with deviations of an adult family member, whereas a younger family member typically has the same behavior and, thus, a large change in the confidence value should be associated with deviations of a younger family member. A relatively small change in the confidence value and/or a confidence value that indicates there is a high certainty associated with the user behaving in a manner that is desired, even if it may deviate from the baseline, may result in no action to perform being determined. Additionally, the confidence value may vary with time because, for example, an adult and a child are both using the computing device. In this scenario, additional information may be appended to an action, for example, if an alert is transmitted to a parent, indicating that more than one user appears to be using the computing device.

An action to perform is determined, based on the confidence value and the user behavior 118. The action may be determined if the confidence value reaches a threshold value, or if there is any change in the confidence value indicating a deviation in baseline user behavior. Additionally or alternatively, an action may be determined based on the frequency of change in confidence value, for example, if a user repeatedly deviates in a manner that gives rise to a relatively small change in the confidence value. In the example in FIG. 1, the action is to stop the action movie from playing 120. Although not shown, the action may be one of displaying a pop-up, blocking access to a subset of content based on a rating value, blocking access to all content and/or transmitting a message to another user. The action is then performed 122 at the laptop 100: in this case the movie is stopped from playing.

Although not shown, another example includes a router, or a gateway computing device, running parental control software. The user profile may comprise a MAC address of a computing device connected to the router. A baseline user behavior may be determined for each computing device connected to the router, and/or the baseline user behavior may be determined with respect to the all of the computing devices connected to the router. For example, it might be determined that four out of five connected devices do not access adult content. Thus, if a sixth device is connected to the router, a baseline user behavior of not accessing adult content may be assumed. Each device may be monitored for deviations from the baseline user behavior. A confidence value may be generated for each device, taking into account the baseline user behavior associated with each device and/or the baseline behavior associated with all of the devices connected to the router. For example, a larger weighting may be given to an action that is different from the baseline associated with all of the devices connected to the router. An action may be performed, at the router. For example, access to the internet may be restricted for a device with a low confidence value.

FIGS. 2A-2E show exemplary environments in which parental controls are automatically implemented at a computing device, in accordance with some embodiments of the disclosure. In a manner similar to that shown in FIG. 1, parental controls are automatically implemented at a laptop 200. However, the different steps may take place at a server 224. The laptop 200 is connected to the server via a communications network, such as the internet. The laptop 200 may be connected by wired and/or wireless means. A user profile is identified 202a, b, c, d, e at the server 224. In this example, the user profile is stored at the server and indicates that the user is "John" and is 15 years old 204a, b, c, d, e. As the laptop 200 is used, a baseline user behavior is determined 206a, b, c, d, e. The baseline user behavior may be determined 206a at the laptop 200 or the baseline user behavior may be determined 206b, c, d, e at the server 224. For example, data regarding the user's behavior may be transmitted from the laptop 200, via the communications network to the server 224 such that a baseline user behavior can be determined at the server. In this example, the baseline user behavior is watching cartoons in the den between the hours of 18:00 and 20:00 208a, b, c, d, e.

Once the baseline user behavior has been established, the deviations from the baseline user behavior are monitored for 210a, b, c, d, e. The monitoring 210a, b may be at the laptop 200 or the monitoring 210c, d, e may be at the server 224. For example, data regarding the user's behavior may be transmitted from the laptop 200, via the communications network to the server 224 such that the user behavior can be monitored at the server. In this example, an action movie is watched at the computing device, in the bedroom from 19:30 212a, b, c, d, e. This is a deviation from the baseline user behavior, as the type of content is different, the location is different and the action movie is scheduled to finish after 20:00.

A confidence value is generated based on the deviations from the baseline user behavior 214a, b, c, d, e. In this example, the confidence value is 8 out of 20 216a, b, c, d, e. A low confidence value may reflect that the parental software has a low confidence that the user is behaving in the baseline, normal, manner. The confidence value may be generated 214a, b, c at the laptop 200 or the confidence value may be generated 214d, e at the server 224. Data may be transferred from the laptop 200 to the server 222 or to the laptop 220 from the server 222, via the communications network as appropriate to enable the confidence value to be generated. The confidence value may be generated with a trained network, for example, the confidence value may be generated by a trained artificial intelligence engine, by a trained neural network and/or by machine learning. This may occur through supervised learning, semi-supervised learning and/or unsupervised learning.

An action to perform is determined, based on the confidence value and the user behavior 218a, b, c, d, e. In this example, the action is to stop the action movie from playing 220a, b, c, d, e. The action may be determined 218a,b,c,d at the laptop 200 or the action may be determined 218e at the server 224. The action to be performed may be transmitted from the server 224 to the laptop 200. The action is then performed 222 at the laptop 200: in this case the movie is stopped from playing.

FIG. 3 is an exemplary data structure for indicating baseline user behaviors, deviations from the baseline behaviors and determined actions, in accordance with some embodiments of the disclosure. The data structure 300 indicates a baseline user behavior 302, an associated deviation from the baseline user behavior 304, an associated generated confidence value 306 and a determined action to be performed 308. For example, a baseline user behavior may be watching cartoons between 18:00-20:00, however the user watches an action movie from 19:30. As the type of content is different from the baseline user behavior and the movie is scheduled to finish after 20:00, in this example a confidence value of −15 is generated. In this example, the determined action is to stop the action movie from playing.

Any of the aforementioned data may be populated manually, and/or by a trained network that determines the data from the user behavior.

Figure 4:
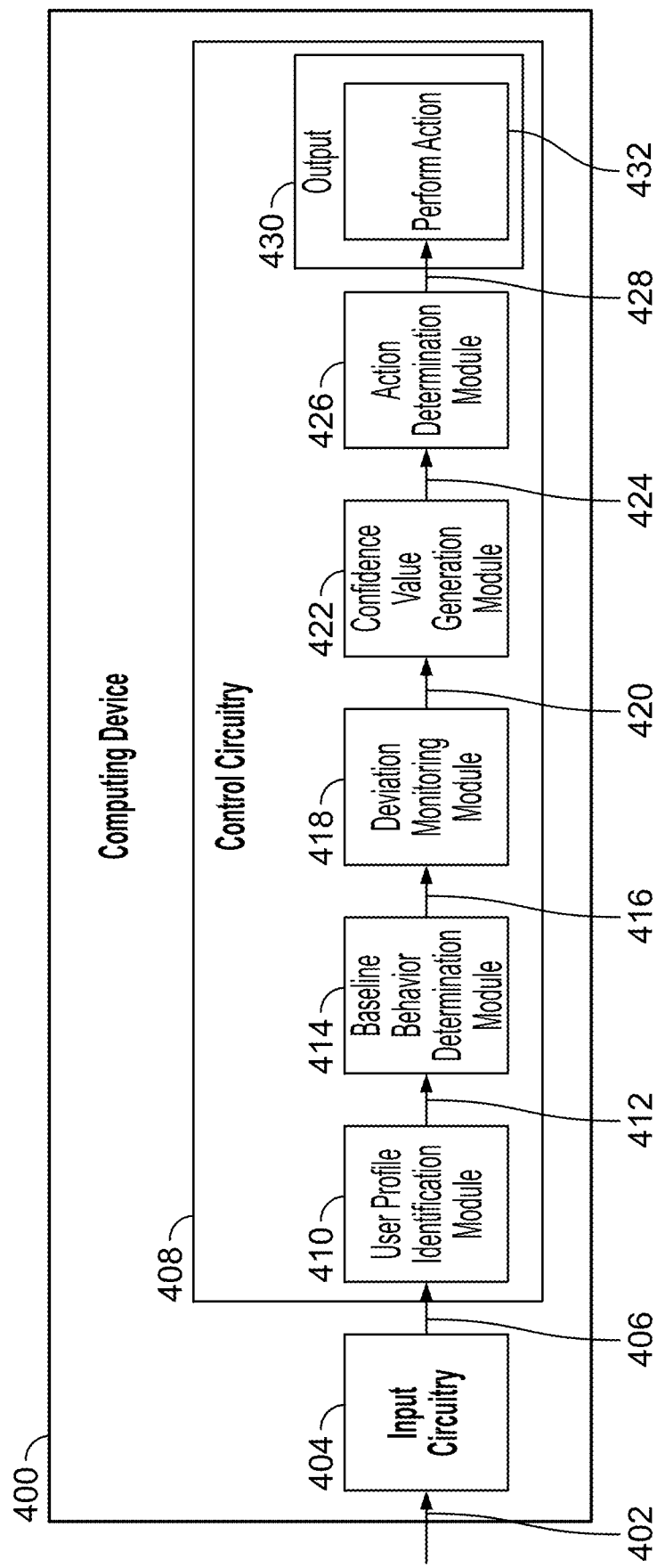
FIG. 4 is a block diagram representing components of a computing device and data flow therebetween for automatically implementing parental controls at a computing device, in accordance with some embodiments of the disclosure.

FIG. 4 is a block diagram representing components of a computing device and data flow therebetween for automatically implementing parental controls at a computing device, in accordance with some embodiments of the disclosure. Computing device 400 (e.g., a device 100 200 as discussed in connection with FIGS. 1-2E) comprises input circuitry 404, control circuitry 408 and an output module 430. Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

A user provides an input 402 that is received by the input circuitry 404. The input circuitry 404 is configured to receive a user input for controlling the computing device 400. Transmission of the input 402 from the input device to the input circuitry 404 may be accomplished using wired means, such as a USB cable, or wireless means, such as BLUETOOTH. The input circuitry 404 transmits 406 the user input to the control circuitry 408.

The control circuitry 408 comprises a user profile identification module 410, a baseline behavior determination module 414, a deviation monitoring module 418, a confidence value generation module 422 and an action determination module 426. Upon the control circuitry 408 receiving the user input, the user profile identification module 410 identifies a user profile and transmits 412 the input to the baseline behavior determination module 414. The baseline behavior determination module 414 determines a baseline user behavior based on the input and, once a baseline user behavior has been determined, transmits 416 the baseline user behavior and the input to the deviation monitoring module 418. The deviation monitoring module 418 monitors for deviations from the baseline user behavior. If a deviation is detected, the deviation monitoring module 418 transmits 420 the deviating user behavior and the input to the confidence value generation module 422. At the confidence value generation module 422, a confidence value is generated based on the deviations from the baseline user behavior. The confidence value and the input are transmitted 424 to the action determination module 426. At the action determination module 426, an action to be performed is determined based on the input and the confidence value. The action to be performed is transmitted 428 to the output module 430. At the output module 430, the action is performed 432.

FIG. 5 is a flowchart representing a process for automatically implementing parental controls, in accordance with some embodiments of the disclosure. Process 500 may be implemented on any aforementioned computing device 100, 200, 300. In addition, one or more actions of process 500 may be incorporated into or combined with one or more actions of any other process or embodiment described herein.

At 502, a user profile is identified. At 504, a baseline user behavior associated with the user profile is determined. At 506, deviations from the baseline user behavior at a computing device are monitored for. At 508, a confidence value based on the deviations from the baseline user behavior is generated. At 510, it is optionally determined whether the confidence value is below a threshold value. If the confidence value is not below the threshold value, then the monitoring for deviations continues. If the confidence value is below the threshold value then at 512, an action to perform at the computing device is determined. At 514, the action is performed at the computing device.

Figure 6:
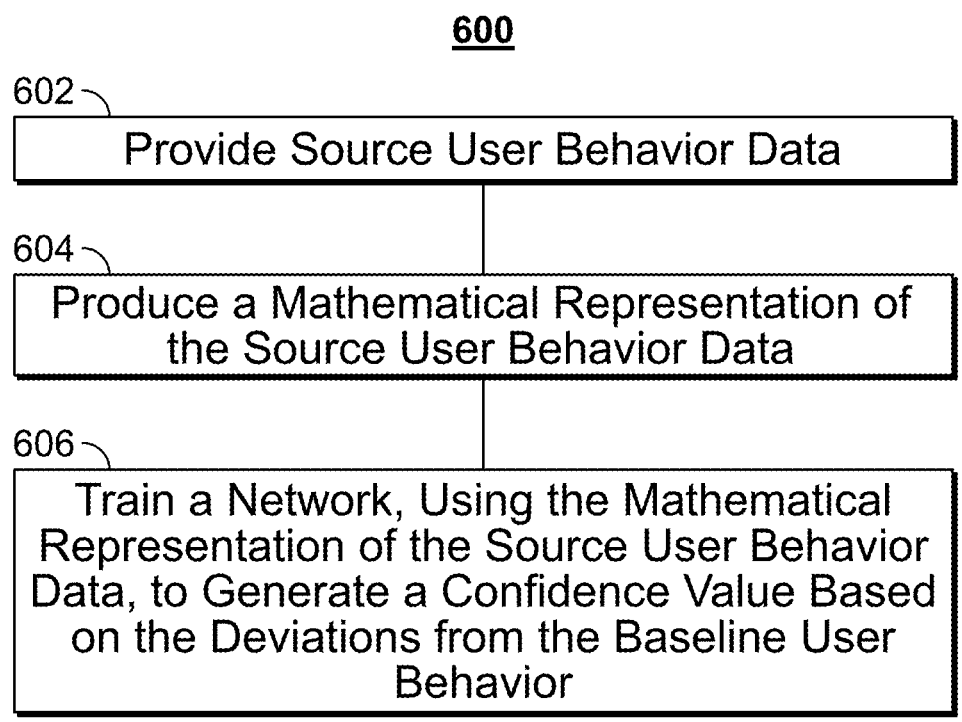
FIG. 6 is a flowchart representing a process for training a network to generate a confidence value based on deviations from baseline user behavior, in accordance with some embodiments of the disclosure.

FIG. 6 is a flowchart representing a process for training a network to generate the confidence value, in accordance with some embodiments of the disclosure. Process 600 may be implemented on any computing device. In addition, one or more actions of process 600 may be incorporated into or combined with one or more actions of any other process or embodiment described herein.

At 602, source user behavior data is provided. The source user behavior data may comprise a plurality of user behaviors associated with a computing device and/or a user profile for a computing device. At 604, a mathematical representation of the source user behavior data is produced. The source user behaviors may be assigned a value that represents the context of the user behavior (i.e., whether it should lead to an increase or a decrease in the confidence value). At 606, the network is trained, using the mathematical representation of the source user behavior data, to generate a confidence value based on the deviations from the baseline user behavior.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically implementing parental controls at a computing device, the method comprising:
identifying a user profile of a user;
determining a baseline user behavior associated with the user profile, wherein the baseline user behavior comprises location information and a baseline type of content accessed;
monitoring for deviations from the baseline user behavior associated with the user profile, wherein the deviations correspond to a deviation type comprising one or more of (a) a deviation in location at which content is accessed by a device of the user, (b) a deviation in time at which content is accessed by the device of the user, or (c) a deviation in content type of content accessed by the device of the user;
generating, based on comparing (a) the deviations from the baseline user behavior to (b) the baseline user behavior, a confidence value; wherein;
the confidence value is indicative of a level of difference between the baseline user behavior and the deviations from the baseline user behavior;
the confidence value decreases for each monitored deviation from the baseline user behavior; and
the confidence value increases after a time period without any monitored deviations;
determining, based on (a) the deviation type and (b) the confidence value being below a threshold level, an action to perform wherein the action comprises any of generating a notification for display at the device of the user, blocking access by the device of the user to content, or transmitting a message to another user; and
performing the action.

2. The method of claim 1, wherein the confidence value is generated with a trained network.

3. The method of claim 1, wherein at least one of the determining the baseline user behavior, monitoring for deviations, generating the confidence value, determining the action to perform and/or performing the action is at a server.

4. The method of claim 1, wherein:
the determining the baseline user behavior comprises determining a baseline type of content accessed; and
the monitoring for deviations comprises monitoring for deviations in the type of content accessed.

5. The method of claim 1, wherein:
the determining the baseline user behavior comprises determining whether the user accesses marked content and, if the user accesses marked content, determining a baseline type and/or frequency of the marked content accessed; and
the monitoring for deviations comprises monitoring for deviations in the type and/or frequency of the marked content accessed.

6. The method of claim 1, wherein:
the determining the baseline user behavior comprises determining a baseline location pattern associated with the computing device and/or the user profile; and
the monitoring for deviations comprises monitoring the location of the computing device or a computing device associated with the user profile and, if the location of the computing device deviates from the location pattern, determining a frequency of deviation and/or a distance of deviation from the location pattern.

7. The method of claim 1, wherein:
the determining the baseline user behavior comprises determining an approximate age of a user and/or identifying a stored user age; and the monitoring for deviations comprises monitoring for a user input comprising an age that differs from the determined age and/or the stored user age.

8. The method of claim 1, wherein:
the determining the baseline user behavior comprises determining a user credential input pattern, the credential input pattern comprising a user typing cadence and/or incorrect user input; and
the monitoring for deviations comprises monitoring for deviations in the user typing cadence and/or for deviations in incorrect user input.

9. The method of claim 1, wherein:
the determining the baseline user behavior comprises determining a baseline computing device volume associated with the user; and
the monitoring for deviations comprises monitoring for a deviation in the computing device volume associated with the user.

10. The method of claim 1, wherein the action is one of displaying a pop-up, blocking access to a subset of content based on a rating value, blocking access to all content and/or transmitting a message to another user.

11. A system for automatically implementing parental controls at a computing device, the system comprising:
a communication port; and
control circuitry configured to:
identify a user profile of a user;
determine a baseline user behavior associated with the user profile, wherein the baseline user behavior comprises location information and a baseline type of content accessed;
monitor for deviations from the baseline user behavior associated with the user profile, wherein the deviations correspond to a deviation type comprising one or more of (a) a deviation in location at which content is accessed by a device of the user, (b) a deviation in time at which content is accessed by the device of the user, or (c) a deviation in content type of content accessed by the device of the user;
generate, based on comparing (a) the deviations from the baseline user behavior to (b) the baseline user behavior, a confidence value; wherein:
the confidence value is indicative of a level of difference between the baseline user behavior and the deviations from the baseline user behavior;
the confidence value decreases for each monitored deviation from the baseline user behavior; and
the confidence value increases after a time period without any monitored deviations;
determine, based on (a) the deviation type and (b) the confidence value being below a threshold level, an action to perform wherein the action comprises any of generating a notification for display at the device of the user, blocking access by the device of the user to content, or transmitting a message to another user; and
perform the action.

12. The system of claim 11, wherein the control circuitry configured to generate the confidence value is further configured to generate the confidence value with a trained network.

13. The system of claim 11, wherein the control circuitry is further configured to communicate with a server and wherein the server comprises control circuitry configured to carry out at least one of the determining the baseline user behavior, monitoring for deviations, generating the confidence value, determining the action to perform and/or performing the action.

14. The system of claim 11, wherein:
the control circuitry configured to determine the baseline user behavior is further configured to determine a baseline type of content accessed; and
the control circuitry configured to monitor for deviations from the baseline user behavior is further configured to monitor for deviations in the type of content accessed.

15. The system of claim 11, wherein:
the control circuitry configured to determine the baseline user behavior is further configured to determine whether the user accesses marked content and, if the user accesses marked content, to determine a baseline type and/or frequency of the marked content accessed; and
the control circuitry configured to monitor for deviations from the baseline user behavior is further configured to monitor for deviations in the type and/or frequency of the marked content accessed.

16. The system of claim 11, wherein:
the control circuitry configured to determine the baseline user behavior is further configured to determine a baseline location pattern associated with the computing device and/or the user profile; and
the control circuitry configured to monitor for deviations from the baseline user behavior is further configured to monitor the location of the computing device or a computing device associated with the user profile and, if the location of the computing device deviates from the location pattern, determine a frequency of deviation and/or a distance of deviation from the location pattern.

17. The system of claim 11, wherein:
the control circuitry configured to determine the baseline user behavior is further configured to determine an approximate age of a user and/or identify a stored user age; and
the control circuitry configured to monitor for deviations from the baseline user behavior is further configured to monitor for a user input comprising an age that differs from the determined age and/or the stored user age.

18. The system of claim 11, wherein:
the control circuitry configured to determine the baseline user behavior is further configured to determine a user credential input pattern, the credential input pattern comprising a user typing cadence and/or incorrect user input; and
the control circuitry configured to monitor for deviations from the baseline user behavior is further configured to monitor for deviations in the user typing cadence and/or for deviations in incorrect user input.

19. The system of claim 11, wherein:
the control circuitry configured to determine the baseline user behavior is further configured to determine a baseline computing device volume associated with the user; and the control circuitry configured to monitor for deviations from the baseline user behavior is further configured to monitor for deviations in the computing device volume associated with the user.

20. A method for automatically implementing parental controls at a computing device, the method comprising:
identifying a user profile;
determining a baseline user behavior associated with the user profile;
monitoring for deviations from the baseline user behavior associated with the user profile, wherein the deviations correspond to a deviation type comprising one or more of (a) a deviation in location at which content is accessed by a device of the user, (b) a deviation in time at which content is accessed by the device of the user, or (c) a deviation in content type of content accessed by the device of the user;

generating, based on comparing (a) the deviations from the baseline user behavior to (b) the baseline user behavior, a confidence value; wherein:
  the confidence value is indicative of a level of difference between the baseline user behavior and the deviations from the baseline user behavior;
  the confidence value decreases for each monitored deviation from the baseline user behavior; and
  the confidence value increases after a time period without monitoring any deviations;

in response to determining that the confidence value is below a threshold value, determining an action to perform based at least in part on the deviation type wherein the action comprises any of generating a notification for display at the device of the user, blocking access by the device of the user to content, or transmitting a message to another user; and performing the action.

\* \* \* \* \*